(12) United States Patent
Wright

(10) Patent No.: US 8,782,616 B2
(45) Date of Patent: Jul. 15, 2014

(54) TEMPLATES FOR CONFIGURING DIGITAL SENDING DEVICES TO ACHIEVE AN AUTOMATED BUSINESS PROCESS

(75) Inventor: David W. Wright, Eagle, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2014 days.

(21) Appl. No.: 10/756,598

(22) Filed: Jan. 12, 2004

(65) Prior Publication Data
US 2005/0216507 A1 Sep. 29, 2005

(51) Int. Cl.
G06F 9/45 (2006.01)
G06F 9/44 (2006.01)

(52) U.S. Cl.
USPC .............. 717/136; 717/106; 717/120

(58) Field of Classification Search
USPC ......... 717/106–109, 120–121, 136, 168–178; 705/2, 4, 7, 8
See application file for complete search history.

(56) References Cited

U.S. PATENT DOCUMENTS

| 5,734,837 | A | * | 3/1998 | Flores et al. ...................... 705/7 |
| 5,864,871 | A | | 1/1999 | Kitain et al. |
| 6,073,109 | A | * | 6/2000 | Flores et al. ...................... 705/8 |
| 6,115,549 | A | * | 9/2000 | Janis et al. ...................... 717/172 |
| 6,167,564 | A | | 12/2000 | Fontana et al. |
| 6,256,676 | B1 | | 7/2001 | Taylor et al. |
| 6,275,977 | B1 | * | 8/2001 | Nagai et al. ................... 717/104 |
| 6,356,903 | B1 | | 3/2002 | Baxter et al. |
| 6,370,544 | B1 | | 4/2002 | Krebs et al. |
| 6,370,681 | B1 | * | 4/2002 | Dellarocas et al. ........... 717/110 |
| 6,489,980 | B1 | | 12/2002 | Scott et al. |
| 6,772,192 | B1 | * | 8/2004 | Fulton et al. ................... 709/203 |
| 6,938,240 | B2 | * | 8/2005 | Charisius et al. ............. 717/104 |
| 2002/0052769 | A1 | * | 5/2002 | Navani et al. ...................... 705/7 |
| 2003/0050800 | A1 | * | 3/2003 | Brandt et al. ...................... 705/2 |
| 2003/0236689 | A1 | * | 12/2003 | Casati et al. ...................... 705/7 |
| 2004/0068424 | A1 | * | 4/2004 | Lee et al. .......................... 705/7 |
| 2004/0187095 | A1 | * | 9/2004 | Gilfix et al. .................... 717/120 |

OTHER PUBLICATIONS

"Enterprise Content Management: The Next Frontier" (http://www.webreference.com/internet/enterprise/6.html Monday, Jul. 21, 2003), webpage, Jul. 21, 2003.

* cited by examiner

Primary Examiner — Jason Mitchell
(74) Attorney, Agent, or Firm — Walter W. Karnstein

(57) ABSTRACT

A content management method is described. The method includes identifying digital sending devices. The method includes authoring an automated business process design. And the method includes translating the automated business process design into information technology templates for configuring each of the identified digital sending devices to achieve the automated business process.

32 Claims, 3 Drawing Sheets

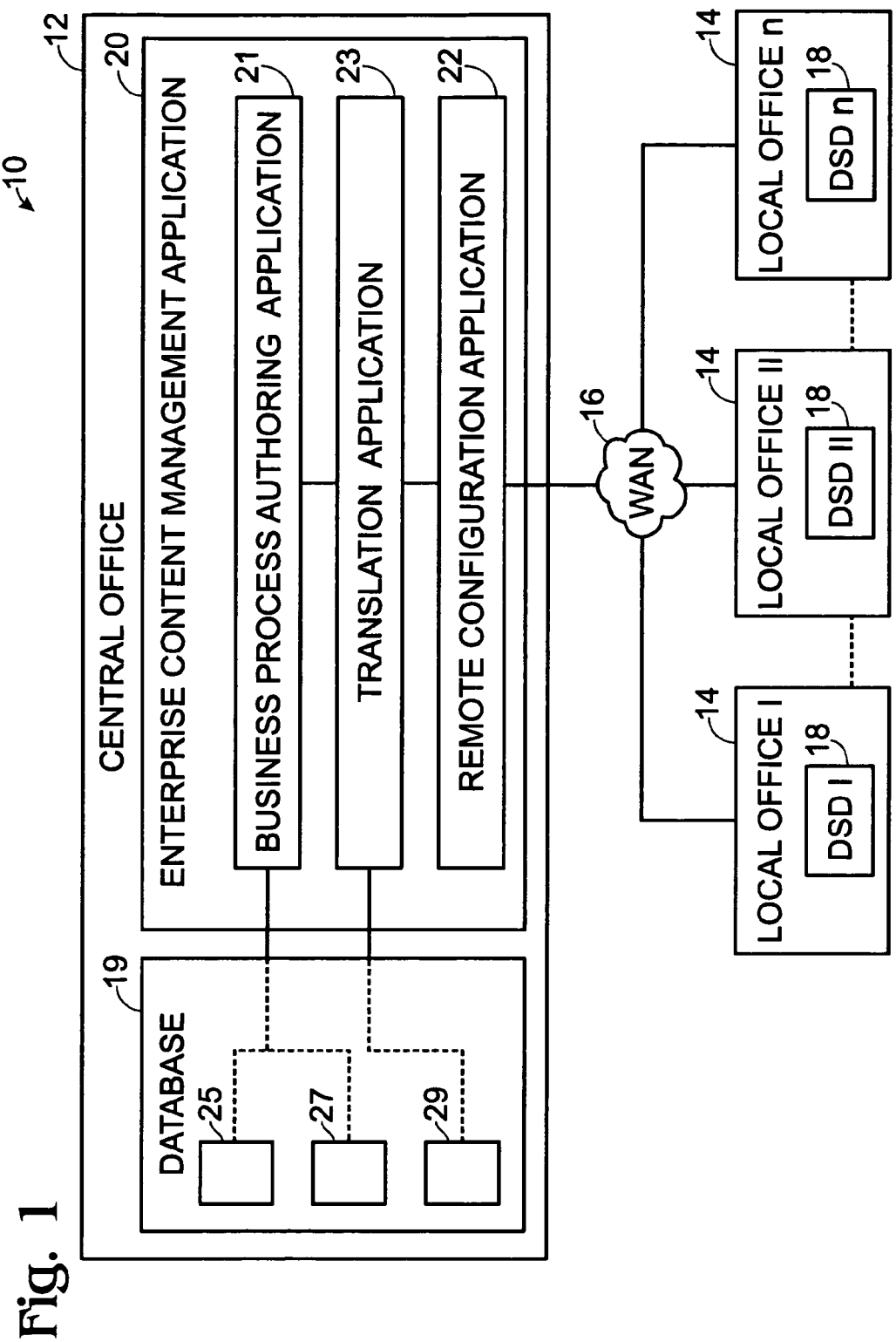

TEMPLATES FOR CONFIGURING DIGITAL SENDING DEVICES TO ACHIEVE AN AUTOMATED BUSINESS PROCESS

BACKGROUND

Key enterprise applications, such as enterprise content management systems, include software applications and hardware solutions that capture documents and integrate them into high value implementations of business processes. For example, in the insurance industry, claims need to be processed efficiently throughout the insurance company's various local offices. A standardized claim form typically will have to be submitted by the insured party. The claim form may be scanned at a local insurance office and sent to a central office for approval and, if called for, payment of the claim. Local offices may not all have the same type of digital sending device or equipment to send the claim form to the central office for processing the claim form. Changes to the insurance companies claim-form-processing process may involve reconfiguration of the software and hardware that scans, parses, processes and transmits claim form data through the insurance company's business organization. Typically, these changes involve information technology professionals who reconfigure the company's set of digital sending devices, and other business hardware and software infrastructure.

Business analysts evaluate the various business processes and look for more efficient and cost effective ways of achieving the needed steps to provide the business service or function. Business analysts may develop more efficient, cost-effective processing methods by modifying the data gathered, and/or by modifying how that data is processed through various parts of the business's organization. These methods then may be explained to the relevant information technology professionals so that they can make the required reconfigurations of the business's hardware and software infrastructure to implement the methods.

Often, the translation between business analyst and information technology professional is difficult and communication is not always flawless. This may result in improperly configured hardware and software, thereby causing bugs in the process, or slowing implementation of the business analyst's methods.

BRIEF DESCRIPTION OF THE DRAWINGS

FIG. 1 is a schematic representation of a business organization and communications network system employing an embodiment of the invention.

DETAILED DESCRIPTION

Figure 5:
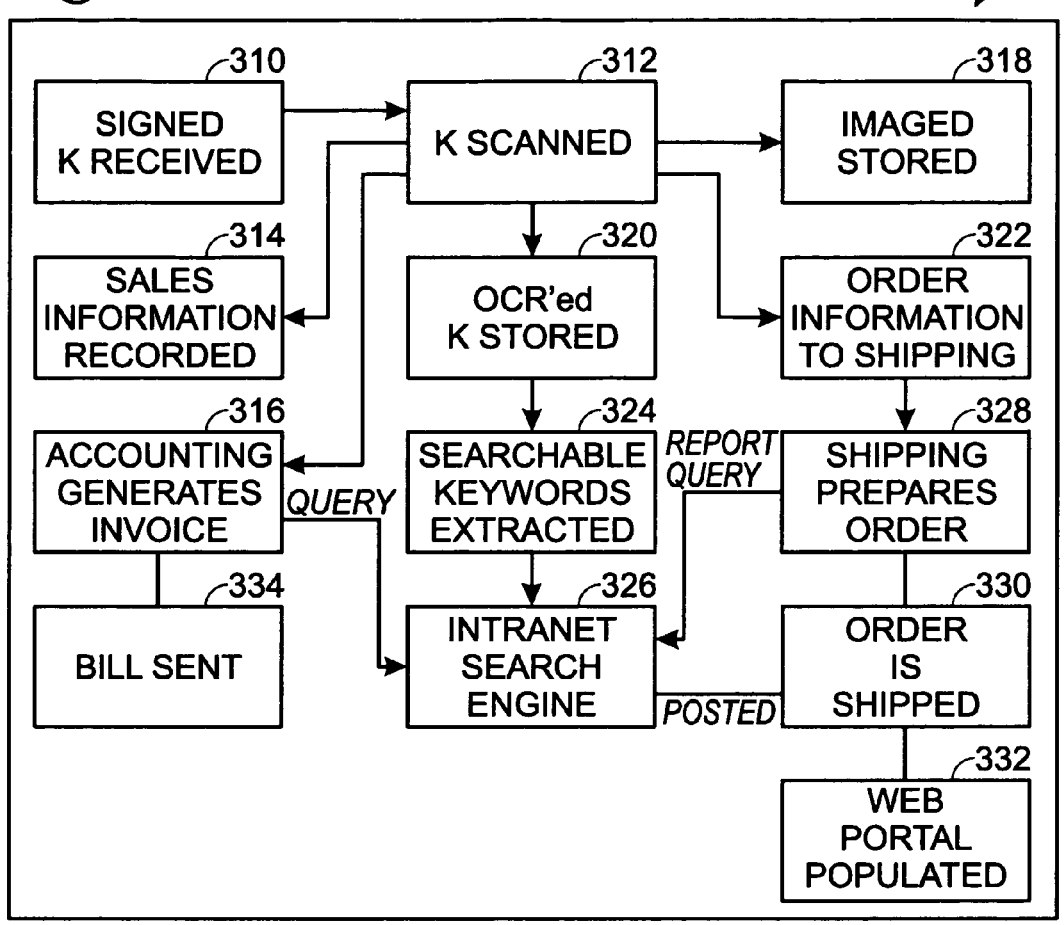
FIG. 5 is a schematic representation of a business process designed via the user interface of FIG. 2, showing a process for handling sales contracts, according to an embodiment of the invention.

Referring initially to FIG. 1, a business organizational structure 10 is shown. Structure 10 exemplifies a central office/branch office structure that may exist for various types of business organizations. While this is not the only type of organizational structure that may exist, it will serve as an example, illustrating remote configuration of digital sending devices for implementing business automation processes. Furthermore, it will be understood that other organizational structures may employ variations of the enterprise content management system described herein.

As shown, organizational structure 10 includes a central office (or management center) 12 and branch or local offices 14. Communication between branch offices 14 and central office 12 may occur using a communications network 16. Each local office may include one or more digital sending devices (DSD) 18, which facilitates communication via communications network 16. Central office 12 may also include a data storage system 19 for storing an organization's data.

Certain tasks may be executed by central office 12 to achieve efficiencies. Branch offices 14 may interact with customers in diverse geographic locations, providing certain services directly to customers, and acting as conduits between the central office of an organization and the customer for other services. For example, insurance claims may be taken by local insurance agents and processed through a central claims office.

One notable feature of the modern business organization may be the use of automated processes for accomplishing business tasks. Documents may be processed, or even created, electronically. Modern electronic communications may enable electronic data and documents to be processed through an organization in parallel. Information may be parsed from documents, and copies of relevant information sent for processing through a plurality of physically diverse channels within an organization. For example, an insurance claim form may be parsed for policyholder information that may be forwarded to a policy maintenance department. The policy maintenance department may use the parsed information to determine if the policy is in effect and the scope of the policy's coverage. The claim type information may be parsed from the claim form and the claim details may be forwarded to an appropriate claim investigation department. The claim investigation department then may investigate the claim. Other similar processes may be carried out with the claim form to complete the insurance company's processing of the form.

Digital sending devices 18 may be provided as part of the business infrastructure for processing data electronically. A digital sending device may include a number of hardware and software configurations and structures. A multi-function office peripheral, such as a fax/scanner/copier/printer device may serve as a digital sending device. Additionally, combinations of scanner machines and computer terminals loaded with appropriate software may be configured to function as digital sending devices. That is to say, a digital sending device as used herein may include hardware, software, and/or combinations of hardware and software configured to effect digital sending of data within an enterprise. For example, an insurance claim may be processed with a web-based form filled out by the policyholder through a customer service web site. Data received may be digitally sent to the appropriate policy reviewers, investigators, and claims departments to process the claim. In order to function efficiently, organizations may generate uniform standards for processing information and routing workflow. Additionally, organizations allow modifying of the automated business processes used in order to generate more efficiency, or to provide new services to their customers.

One obstacle that may be faced by an enterprise having organizational structure 10 is that branch offices 14 may have a heterogeneous mix of digital sending devices 18. For example, as shown in FIG. 1, branch office "I" may have a first type of a digital sending device (DSD I), branch office "II" may have a second type of digital sending device (DSD II), and branch office "N," may have an $N^{th}$-type digital sending device (DSD N). As indicated by the numbering scheme (I, II, . . . N), any number of different digital sending devices are possible. It is also possible that subsets of branch offices may have the same type of digital sending devices 18.

Implementing an enterprise-wide data-processing/workflow system for achieving a certain automated business process involves the heterogeneous mix of different digital sending devices to be configured to achieve a standardized data-processing/workflow. Typically, implementing the enterprise-wide data-processing/workflow system involves communicating a description of the data-processing/workflow system created by a business analyst, to an information technology expert. The information technology expert may then manually translate the data-processing work flow system to a plurality of communications and data processing configurations for specific digital sending devices and the enterprise's communications infrastructure. The translation may include adding software and communications infrastructure tools to achieve the desired automated business processes through standardized data processing and a predefined workflow. The translation may be accomplished using a set of databases stored on data storage system 19 containing libraries of templates. A library of user-device interaction templates may be used to define a user interaction with components of an enterprise's data, communications and work processing infrastructure. A library of workflow routing and data processing templates may be used to define how data flows through and is processed by an enterprise's data, communications and work processing infrastructure. A library of information technology templates may be stored as one of the databases. The library of information technology templates may include configurations and instructions for enabling a specific digital sending device to perform a specific task. Breaking down an automated business process design into elements or sub-processes that can be achieved by applying one or more of the information technology templates to the enterprise's data, communications, and work processing infrastructure, as will be explained in more detail below.

An enterprise content management application 20 located at central office 12 may be used to help manage the data processing and workflow system required by organizational structure 10 to achieve business goals of the automated business process. Enterprise content management application 20 manages the flow and processing of documents and data to achieve the automated business process. A business process may be any routine, procedure, set of steps, or actions that are needed to achieve the enterprise's objective. Non-limiting examples of business processes include processing travel requests, insurance claims, loan applications, filling sales orders, billing for services, processing contracts, etc. The universe of business processes is virtually limitless. Any function or action performed to achieve a result may be defined as a business process.

Enterprise content management application 20 may enable or support several applications. One application may be remote configuration of digital sending devices, which enables implementation of system/enterprise wide changes to an enterprise's data, communications and work processing infrastructure. For example, the proper configuration of digital sending devices may allow an enterprise to capture and retrieve indexed information to support searches and other applications. Remote configuration of digital sending devices may be accomplished via a remote configuration application 22, which may be a part of enterprise content management application 20, or may be external to application 20.

Enterprise content management application 20 may include a business process authoring application 21 for development and selection of user-device interaction templates 25, and development and selection of workflow-routing and data-processing templates 27. An author may create an automated business process design by selecting and arranging user-device interaction templates 25 and workflow-routing and data-processing templates 27. User-device interaction templates may be stored in a database on data storage system 19. Workflow-routing and data-processing templates 27 may also be stored in a database on data storage system 19. An automated business process may be created using authoring application 21 by selecting, designing, ordering, and interconnecting user-device interaction templates 25 and workflow-routing and data processing templates 27.

Enterprise content management application 20 also may include a translation application 23, which may enable translation in an intelligent way between the automated business process (consisting of user device interaction templates 25, workflow-routing and data-processing templates 27) and information technology templates 29. A library of information technology templates 29 may be stored on data storage system 19 and be accessible by enterprise contact management application 20 and translation application 23. It should be understood that the translation application may also be external to the enterprise content management application.

The information technology templates may configure the enterprise infrastructure to implement the automated business process. A user device interaction template defines the steps, or actions that a person, or user, must take to cause a digital sending device, or other network device, to perform the desired portion, element, or step of the automated business process.

Combining authoring tools for development of user device interaction templates and development of workflow-routing and data processing templates enables enterprise content management application 20 to design automated business processes for both standardization of the user experience and standardization of workflow routing and data processing.

Translating the user-device interaction templates and the workflow-routing and data-processing templates into information technology templates that contain digital sending device configurations and organizational communications instructions, allows enterprise content management application 20 to employ the remote configuration application 22 to roll out or implement on an enterprise's infrastructure the automated business process developed by the business analyst using the authorizing tools.

Information technology templates may include data processing rules. A data processing rule may include digital sending protocols, file formatting, electronic signature procedures and/or requirements, security measures, encryption information and/or standards, network addressing conventions, etc.

Digital sending protocols may include TCP/IP, HTTP, SMTP, MIME, and any other suitable network communications protocol for transferring data between nodes of a network. File formatting may be the method used to write data onto a storage media for use by certain applications. For example, files may be in comma delimited format, rich text format, etc. Electronic signature procedures or requirements may control the validation of a statement of identity. Security measures may define the level of security or the security procedures that data on an enterprises infrastructure must comply with in order to be processed. For example, using a public key encryption system may be a security measure that governs securing data. Network addressing conventions may determine how components of an enterprise's infrastructure may be named or addressed for interaction with other components of the infrastructure.

A powerful tool may be created by software for translating the user-device interaction templates 25 and data-processing and workflow-routing templates 27 into information technology templates 29. This software may potentially eliminate the need to use networking, computer, and other technical personnel to implement, or roll out an automated business processes The translation process, implemented by translation application 23, may reduce errors caused by miscommunications between the business analyst and the technical personnel. The translation process may also speed the implementation of new automated business processes.

Remote configuration application 22 generally supports sending and installing configurations to multiple digital sending devices. Remote configuration application 22 may be configured to poll, or query enterprise communication network 16 to identify all digital sending devices 18 present on the network. During the poll of network 16, the remote configuration application may store a status list identifying the type, present configuration and previous configuration of each digital sending device 18 found during the poll. The status list, because it includes present and previous configuration data for each device, enables remote configuration application 22 to both roll out configuration updates and roll back configuration updates. It may be desirable to roll back a configuration update, if a problem in the process is discovered, or if implementation does not achieve the desired result. A roll back may also be useful in the case where a bug or other problem is found in the update.

Remote configuration application 22 may process the roll out of an update by sending out updates in parallel for all digital sending devices 18 of a specific type. After all the devices of a first type are configured, the remote configuration application may move to the next type of digital sending device identified during the poll and, in parallel, update all digital sending devices 18 of that type. This process of parallel configuration of digital sending devices of the same type enables remote configuration application 22 to configure all the digital sending devices identified during the poll. It should be understood that other methods of rolling out configuration updates may be possible, including serial roll outs, as well as, parallel roll outs that use groupings other than like device type. For example, it may be more important to get a specific business unit updated to the same configuration. Serial operation may also be used in circumstances where bandwidth is limited.

As the digital sending devices are updated, the status list may be updated by recording the new configuration status of each device and maintaining a record of the previous status configuration for use in the event that a roll back may be needed. The roll back function can be completed in a parallel process similar to that described for the new configuration roll out, or it can be done one digital sending device at a time. A user also may roll out a new process for a portion of the organization's local offices to experiment and test new automated business processes.

The user device interaction templates 25 and the data processing and workflow routing templates 27, may be created or selected from a library by user interaction with enterprise content management application 20 using authoring application 21. A business analyst tasked with the job of designing more efficient business processes may use the authoring application in the enterprise content management application to develop each type of template that forms a part, element or sub-process of an automated business process. The tools provided by enterprise content management application 20 thus enable the creation of templates both with a graphical user interface and using programmatic commands.

Enterprise content management application 20 may permit combinations of graphical and text elements to construct the templates that form an automated business process. Authoring application 21 may help create these templates by providing a library, or libraries, of common template elements. The authoring application may include modifiable completed templates that may be customized to achieve organization-specific tasks.

A user device interaction template 25 may include a standardized set of sub-processes or actions that a user performs when interacting with a device to achieve the automated business process. For example, in the context of processing insurance claim forms, a user device interaction template 25 may include the following: 1) a user entering an insurance claim form code via a user interface of the digital sending device; 2) a user loading the insurance claim form in a document feed tray of the digital sending device; 3) a user pressing a scan button on the digital sending device to scan the insurance claim form. The user device interaction template 25 thus may define how an employee of the organization interacts with the organization's digital sending devices to carry out business processes. It should be understood that processes may be designed with a validation process. For example, in step one above, the data entered by a user may be checked to determine if the form code entered is a valid code. If the code is not a valid code, the user may be prompted to re-enter the code.

Data-processing and workflow-routing templates 27 may include a standardized set of functions that a digital sending device performs to achieve an automated business process. For example, in the context of processing insurance claim forms, a data processing and workflow template 27 may include the following: 1) a digital sending device receives a claim form code; 2) the device, after a user prompt, scans the claim form; 3) the device parses the identity of the claimant; 4) the device sends an image copy of the claim form to a form image database for archival purposes; 5) the device processes the scanned form for optical character recognition and sends a text-searchable copy of the claim form for storage in a text-searchable database; 6) the device parses the claim type from the claim form and sends a claim-processing request to the appropriate claim-processing department based on the parsed claim type; 7) the device sends a status indicator to a status database that can be used to populate web pages. The web pages may include a customer service web portal used by the claimant to track the status of the claim. The web pages may be an internal management tracking intranet web page.

Data-processing and workflow-routing templates 27 can be constructed to achieve virtually any business process. The data processing and workflow-routing templates 27 may be translated into information technology templates 29 that can direct the actions of digital sending devices 18, and can be used to control or govern other parts of an organization's content management infrastructure. Workflow routing may include determining which members of an organization receive information and when during the process information is received.

User-device interaction templates 25 and data processing and workflow-routing templates 27 may determine when and what information is recorded in storage databases of the organization, how and in what format it is stored, when it is received by the storage database, etc. Data processing may include actions the employees or automated systems perform on the data. There is naturally some overlap between the data-processing templates and workflow-routing templates 27, and some actions may not clearly fall in one or the other category.

Information technology templates 29, as noted above, generally contain device configurations, data and file formats, communications protocols, security settings, network addressing procedures, index capture settings, validation mechanisms for user inputs, data compression settings, etc. Typically, information technology templates 29 embody a host of tools that network and technical support personnel may use to implement automated business processes and configure an organization's infrastructure to implement a business process. The enterprise content management application may enable translating the automated business process into information technology templates without the aid of these technical support personnel.

Figure 2:
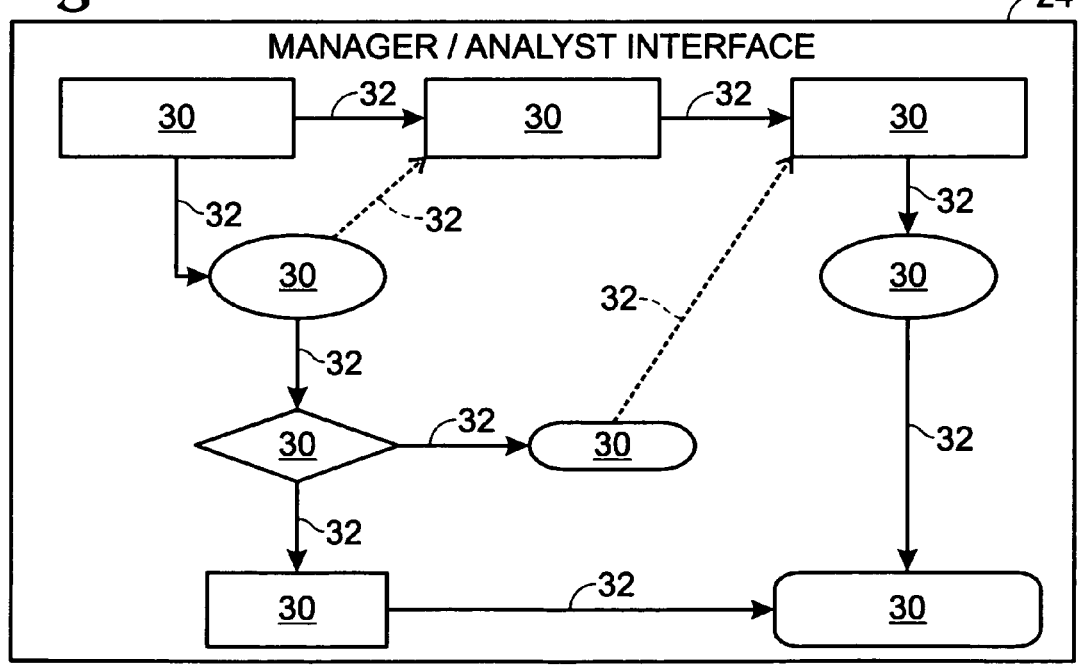
FIG. 2 is a schematic representation of a user interface for designing and creating customized business processes, according to an embodiment of the invention.

FIG. 2 illustrates an automated business process-authoring interface, of authoring application 21, generally indicated at 24, for designing workflow-routing, data-processing and user-device interaction templates, and authoring automated business processes. The interface may enable a user to define icons or symbols 30 to represent tasks, procedures, people, etc. and arrange the icons and symbols to create routing or linking, as indicated by arrows 32, between tasks to model a visualization of the automated business process on screen. A series of operations may also be defined by entering text with a keyboard or similar user interface. The shape and size of any icon 30 may be used to indicate certain functions or, may have no correlation to a function at all. For example, a hexagonal shape may be used to indicate a stop, or pause in the process, while a diamond shape may be used to indicate a decision. However, the icon's shape and size may not convey any information or have any meaning.

Figure 3:
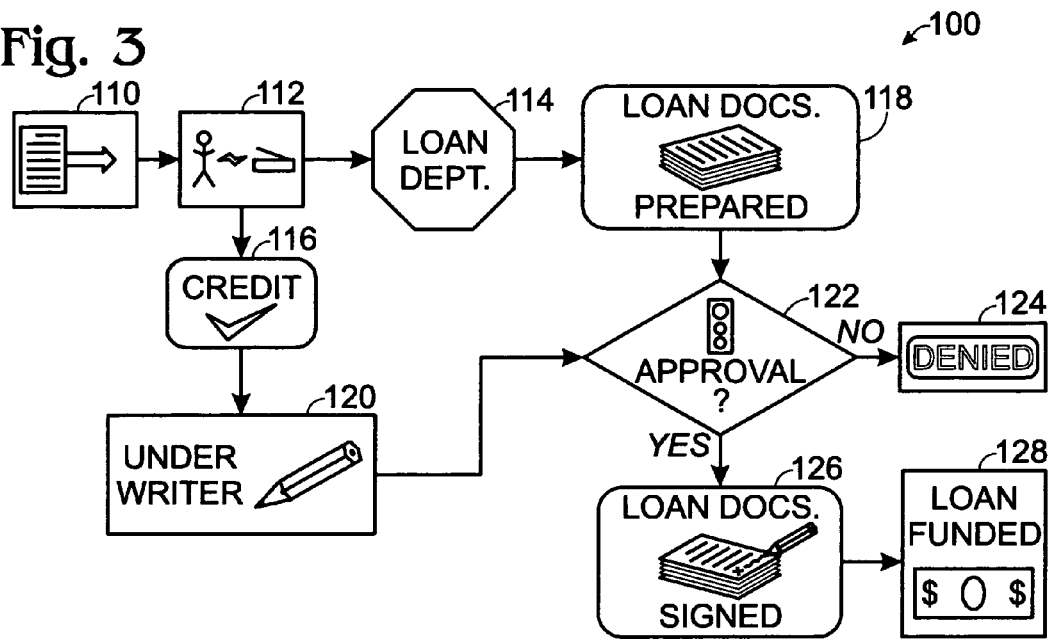
FIG. 3 is a schematic representation of a business process designed via the user interface of FIG. 2, showing a process for loan approval, according to an embodiment of the invention.

A better understanding of an authoring interface is illustrated in the context of a loan application example, as shown in FIG. 3. An automated business process design, authored using an authoring interface, such as that shown at 24, is generally indicated at 100. Automated business process design 100 is merely one example of an automated business process authored using an authoring interface of the present enterprise content management application. Authoring an automated business process generally includes developing the user device interaction templates, the data-processing templates, and the workflow-routing templates. This authoring interface may allow a user to create templates and combine different templates to design an automated business process.

In the exemplary automated business process design 100, a bank loan officer receives a completed loan application, as indicated by box 110. The loan officer then scans the loan application with a digital sending device, as indicated at 112. This can be done according to a standard document scanning user device interaction template, as illustrated by the icon at 112. It should be understood that the process defined by the icon at 112 may be part of a standard scanning user interface that is part of a user-device interaction template library, accessible by the author using the authoring interface. A custom interface may be drafted and assigned to a custom-created icon or name, and may be added to the template library and used in any automated business process design. Scanning data from a hard copy is an example of a data acquisition template that may be employed by a number of different business processes. An author may include the entering of a form code or process identifier (bar codes are typically used as identifiers) to indicate to the digital sending device what automated business process the user is initiating by scanning a particular document.

In automated business process design 100, two events take place simultaneously after the completion of the scanning of the loan application at 112. A copy of the loan application is sent to the loan-processing department of the bank, as indicated at 114, and the required parsed identity information is sent to a credit-reporting agency in order to get a credit report for the applicant of the loan application being processed, as indicated at 116. The connection lines between the elements in the automated business process design displayed, illustrate workflow routing templates that may be used to define the workflow required to achieve the automated business process of design 100.

The preceding two operations of process design 100 may occur at substantially the same time, creating efficiency because parallel processing of the applicant's credit history and the loan documentation may take place. The loan department may prepare loan documents based on the loan application, as indicated at 118. This is an example of a data processing step that the user can define using the authoring interface of the enterprise content management application. The credit report may be forwarded to a loan underwriter, as indicated at 120, which is another example of a workflow-routing template being defined. At 122, the loan underwriter thus may decide, based on the credit report information and underwriting requirements, if the loan should be approved.

The underwriter's approval decision may be forwarded to the bank. The loan documents also may be forwarded to the bank. If the underwriter denies the loan, the applicant may be informed that his application is denied, as indicated at 124. If the underwriter approves the applicant's loan, the applicant may be given the loan documents to sign, as indicated at 126. After the loan documents are signed and recorded the loan may be funded, as indicated at 128.

Figure 4:
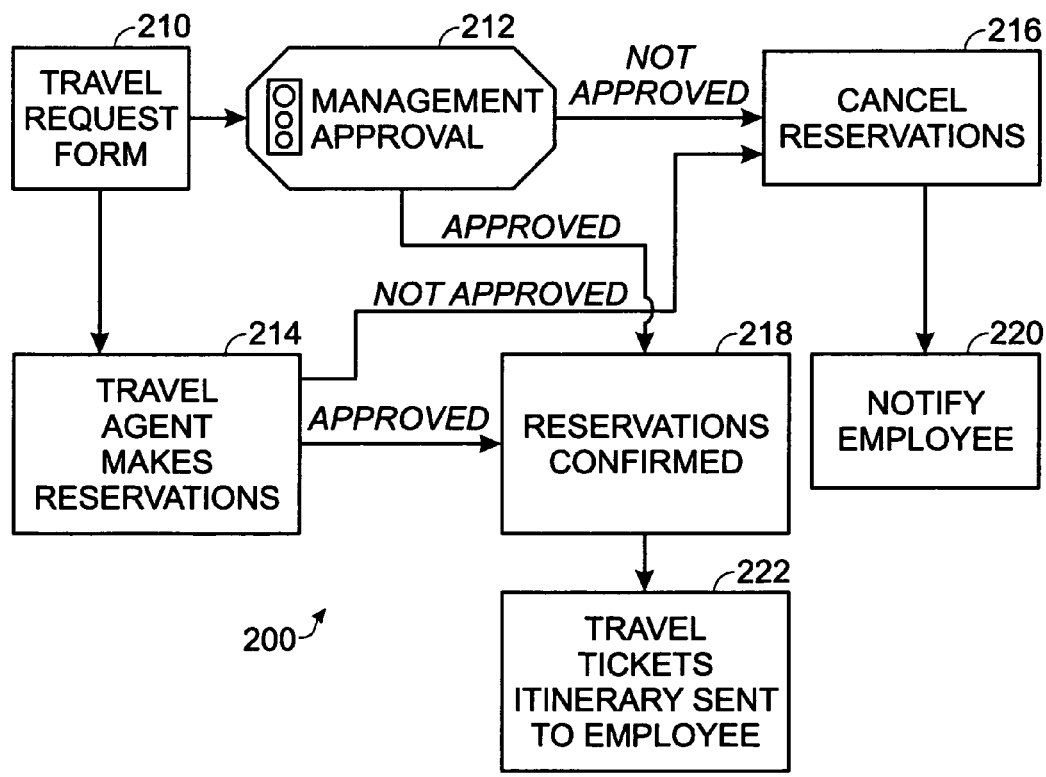
FIG. 4 is a schematic representation of a business process designed via the user interface of FIG. 2, showing a process for travel approval, according to an embodiment of the invention.

The above-described loan processing illustrates how an automated business process may be designed using authoring interface 24 (of FIG. 2) and templates and authoring tools of enterprise content management application 20 (of FIG. 1). It should be understood that the loan processing of process design 100 is only one of a number of possible automated business process designs. Another example of an automated business process, authored using enterprise content management software 20 (of FIG. 1) is shown in FIG. 4.

Enterprise content management application 20 may translate the loan application automated business process design 100, shown in FIG. 3, using translation application 23 into a specific set of information technology templates that, when applied to an enterprise's data infrastructure, enable implementation of the loan application process. Translation application 23 may accomplish this translation by breaking down the loan application process into component elements, parts, or sub-processes, that may be accomplished by one or more users, one or more digital sending devices, one or more of the other components of the enterprise's data infrastructure, and/or combinations of users, digital sending devices, and/or other components. Digital sending devices and/or other components may be configured to achieve the elements, parts, or sub-processes of the loan application process by selecting one or more information technology templates 29 from the library of information technology templates.

As applied to the loan application process of design 100 (shown in FIG. 3), translating the automated business process into information technology templates may include translating the initial receipt by the loan officer of the completed loan application into an information technology template. For example, if the loan application is filled out electronically, then the format of the loan form needs to be determined and suitable information technology templates may be selected from the information technology template library to create a loan application form referencing various fields with the appropriate meta-tags to identify the data being entered, etc. However, if the loan officer receives the loan application as a paper document (as shown in FIG. 3, at 110), then there may not be a translation of this sub-process into an information technology template.

The loan officer may scan a paper document loan application, as indicated at 112 in FIG. 3. The scanning process may be broken down into sub-processes including: placing the loan application on a scanner; scanning the loan application to an image file; performing an optical character recognition process on the image file and storing a text file; parsing data from the text file; generating messages based on the scanned loan application for sending through the loan approval process to one or more recipients; and sending the messages. These sub-processes may be implemented on an enterprise's data infrastructure by translating the sub-processes into one or more information technology templates.

Placing the loan application on a scanner may be a user-device interaction that may not be translated into an information technology template. It should be understood that those elements, parts, or sub-processes of an automated business process that are performed on a component of the data infrastructure may be translated into information technology templates. However, elements, parts, or sub-processes performed by people in the enterprise might not be translated into information technology templates.

Scanning the loan application to an image file may be translated into an information technology template by searching the library of information technology templates to locate one or more image capturing information technology templates designed to configure scanning devices for capturing images. The image capturing information technology templates may set a device's scanning parameters. For example, the image capturing information technology template may determine the resolution of the scan, the scan area, the image file type, compression format, etc. Another factor in selecting an image capturing information technology template may be the capabilities of the scanning device.

Performing an optical character recognition (OCR) process on the image file and storing a text file may be translated into one or more OCR information technology templates from the library of information technology templates. Translating the OCR sub-process into the proper OCR information technology template may include selecting a template based on a variety of factors. Factors for selecting an OCR information technology template may include: a data format of the image file that is being processed; a processor type available to perform the OCR process; a type of image file data, etc. Storing a text file based on the OCR processing of the image file may be translated into one or more text file information technology templates. The text file information technology templates may determine file formatting, and/or other data settings. The selection of a text file information technology template may be determined in part by an organization's preferences for specific file types. For example, an organization may prefer rich text format, thus when translating the process of storing of the text file into a text file information technology template, a text file template using rich text format may be selected from the library of information technology templates.

Translating the sub-process of parsing data from the text file may include selecting a parsing algorithm information technology template from the library of information technology templates. Parsing may include reading meta-data or searching text for specific words, etc.

Translating the sub-process of generating messages based on the scanned loan application may include selecting one or more communications information technology templates from the library of information technology templates. A communications information technology template may include protocols for formatting messages. For example, simple mail transfer protocol (SMTP) or multi-purpose Internet mail extension (MIME) standard may be set as the format for sending messages. It should be understood that selection of communications information technology templates may be based on an organization's preferences. For example, if SMTP is an organizations messaging preference then communications information technology templates configured to format messages for SMTP may be selected during translation of the generating messages operation.

It should be noted, translation of each sub-process of design 100 into information technology templates may be accomplished in a similar manner. The translation of other methods, such as those described below with reference to FIGS. 4 and 5, may also be accomplished in a similar manner.

FIG. 4 illustrates another example of an automated business process design. This process design, indicated by 200, is an automated business process design for approving and booking a travel request. According to the depicted process design, a travel request form is submitted, as indicated at 210. It should be noted that the icon illustrated at 210 may be used to represent a data processing template from the template library, or a custom designed data processing template. In this example, the travel request form may be submitted electronically and a copy of the request may be forwarded to two locations to complete two simultaneous processes.

The travel request may be sent through management approval routing, as indicated at 212. The management approval may be a single operation or it may be multiple operations. In FIG. 4, it is shown as a single operation, where a manager approves or disapproves the travel request. It will be understood that a multiple operation process may be desirable where different managers at various levels approve or disapprove of the travel request. Multiple management approvals may be included, by adding additional routing elements to the design illustrated in FIG. 4.

At the same time that the travel request is being approved, a copy of the travel request may be sent to a travel agent for making the travel reservations for airfare, hotel accommodations, car rental, etc. At this point, only reservations are made, as indicated at 214. If the travel request is not approved, then the reservations may be cancelled, as indicated at 216. After reservations are cancelled, notification may be sent to the employee that the requested travel was not approved, as indicated at 220. At this point the employee can modify the travel request and submit a new travel request in which case the process may be repeated.

If the travel request is approved, the reservations may be confirmed, as indicated at 218. After the reservations are confirmed, as indicated at 218, the employee may be issued a travel itinerary, tickets, and hotel information, etc, as indicated at 222.

Process designs 100 and 200, shown in FIGS. 3 and 4, are examples for illustration purposes only. A further example is shown in FIG. 5, illustrating an automated business process design for receiving contract orders to supply goods. The sales contract process design, indicated at 300 in FIG. 5, illustrates how a large number of processing operations may be carried out simultaneously. Initially a sales contract, or order is received, as indicated by 310. The sales contract then may be scanned using a digital sending device, as indicated at 312.

The digital sending device in this process design may be configured to enable multiple operations to take place simultaneously. The user authoring the automated business process design may define the tasks that the digital sending device needs to perform and may associate all those tasks with an icon. The association may be achieved with text commands, or graphical routing representations, or a combination of both. The digital sending device of this design process may be configured to parse sales data for recording in a sales database, send a copy to the accounting department for future billing purposes, store a copy as an image file in an image data base, create an optical character recognition file of the contract, and parse the needed order information and send such information to the warehouse/shipping department.

As shown at 314, the sales information may be parsed and sent to a sales information database. The sales information database may include information about the identity of the sales representative who gets credit for the sale. This information may be used for determining sales bonuses for the organization sales force. The sales data may also be analyzed to determine future marketing strategies, etc. Sales data also may be used for projecting future revenue and business growth, etc.

As shown at 316, the digital sending device, after scanning the sale contract, may parse and send the financial data to accounting for the generation of an invoice to send to the customer. The financial data may also be used for analyzing the organizations income, cash flow, and overall financial health. Security settings may be used to limit access to the financial data to only personnel that have a particular clearance. The security settings may include encryption or other security technology to limit access this sensitive information. As will be explained below, the invoice may be withheld until a query of the intranet search engine of the organization reveals that the order has been processed.

The digital sending device may also be configured to store a digital image file of the scanned sales document for archival purposes, as indicated at 318. Keeping digital archives enables users of the data to verify the accuracy of elements of the data that were parsed out, or that were generated by optical character recognition. Additionally, this provides further evidence of signatures, etc.

The digital sending device may further be configured to create a text file from the scanned sales contract using optical character recognition software, as indicated at 320. The text file can be stored as a specific type of word processing file, or in portable document format, or some similar type of universal format. Finally, the digital sending device may be configured to send order information to the shipping department of the organization, as indicated at 322.

The text file that was created by optical character recognition software may be placed in a database and referenced so that it can be searched by key words, as indicated at 324. The database containing the text files for searching by key words may be accessible to all employees by an intranet search engine, as indicated at 326. This database may also contain other information related to the sales contract.

After the shipping department receives the order information, the order may be prepared, as indicated at 328. Once the order has been prepared, a status report associated with the order may be sent to the searchable database indicating that order is ready to ship and checking the invoice status for the order. Some orders may be such that they will ship before payment, while others may wait until payment is received.

The status of a contract may be checked by a database query. Various approval conditions may be set to determine when the different events take place. For example, a rule may be set up such that shipping the order, as indicated at 330, only takes place after confirmation from the accounting department that the customer is in good standing, as indicated by the "POSTED" message in FIG. 5.

Once the order is shipped a shipping status or similar notification may be sent to a customer service web portal, i.e. a web portal may be populated with shipping information, as indicated at 332. Or a notification may be emailed directly to an ordering customer. Once the order has been shipped the accounting department may be notified and a bill may be sent to the customer, as indicated at 334.

Enterprise content management application 20 may translate the user device interaction templates, the data-processing templates, and the workflow-routing templates into information technology templates containing configurations and instructions for the digital sending devices 18 and the communication network of organization 10. The translation may be achieved by breaking down each template in the design to a data acquisition processes and routing or data flow processes. Then, using the information about each digital sending device's status from the status list, the enterprise content management application 20 may create configuration instructions that enable the digital sending devices to perform data acquisition processes correctly, and the communications network to perform data flow processes correctly.

When one of the user device interaction templates, of an automated business process, is followed by an employee, the device may perform as required to achieve the needed operations in the overall business process. The translated configurations may be rolled out using the remote configuration application 22 that is part of enterprise content management application 20.

While the present disclosure has been made with reference to the foregoing embodiments, those skilled in the art will understand that many variations may be made therein without departing from the spirit and scope defined in the following claims. The disclosure should be understood to include all novel and non-obvious combinations of elements described herein, and claims may be presented in this or a later application to any novel and non-obvious combination of these elements.

What is claimed is:

1. A content management method, comprising:
identifying digital sending devices in a communications network, wherein each of the identified digital sending devices comprises a combination of hardware and software that is operable to capture data from documents and send the captured data over the communications network;
generating an automated business process design comprising one or more definitions of user interactions with respective ones of the identified digital sending devices and one or more functions performed by respective ones of the digital sending devices; and
translating the automated business process design into digital sending device configurations comprising data processing rules for capturing the data and instructions for sending the captured data over the communications network in accordance with the automated business process design; and
configuring the identified digital sending devices in accordance with the digital sending device configurations;
wherein the identifying, the generating, the translating, and the configuring are performed by a computer system.

2. The content management method of claim 1, wherein the translating comprises determining a digital sending device configuration for each of the identified digital sending devices.

3. The content management method of claim 1, wherein the translating comprises creating the data processing rules.

4. The content management method of claim 3, wherein creating data processing rules includes setting digital sending protocols.

5. The content management method of claim 4, wherein setting digital sending protocols includes one or more of: setting encryption standards, setting signature requirements, setting file format types, collecting retrieval index information, setting compression requirements, and setting network addresses.

6. The content management method of claim 1, wherein the configuring comprises remotely configuring each identified digital sending device to perform the automated business process.

7. The content management method of claim 6, wherein remotely configuring each identified digital sending device includes using a remote configuration application to send two or more of the identified digital sending devices a configuration in parallel.

8. The content management method of claim 1, wherein the generating comprises:
  generating at least one data processing template for the business process; and
  generating at least one workflow-routing template for the business process.

9. The content management method of claim 8, wherein the generating comprises generating at least one user device interaction template for the business process.

10. The content management method of claim 9, wherein the translating comprises selecting information technology templates based on the at least one data-processing template and the at least one workflow-routing template.

11. A content management system, comprising:
  a plurality of digital sending devices in a communications network, wherein each of the digital sending devices comprises a combination of hardware and software that is operable to capture data from documents and send the captured data over the communications network; and
  a computer system operable to perform operations comprising
    generating an automated business process design comprising one or more definitions of user interactions with respective ones of the identified digital sending devices and one or more functions performed by respective ones of the digital sending devices, and
    translating the automated business process design into digital sending device configurations comprising data processing rules for capturing the data and instructions for sending the captured data over the communications network in accordance with the automated business process design, and
    configuring the identified digital sending devices in accordance with the digital sending device configurations.

12. The content management system of claim 11, wherein the translating comprises determining a digital sending device configuration for each of the identified digital sending devices.

13. The content management system of claim 11, wherein generating comprises interconnecting:
  data-processing templates defining common sub-processes of automated business processes; and
  workflow-routing templates defining common sub-processes of automated business processes.

14. The content management system of claim 13, wherein the translating comprises determining the digital sending device configurations based on the interconnected data-processing templates and workflow-routing templates, and enterprise preferences.

15. The content management system of claim 14, wherein enterprise preferences include one or more of: file format type, communications protocols, and network addressing conventions.

16. The content management system of claim 13, wherein the interconnected data-processing templates and workflow-routing templates define an automated business processes.

17. A program storage device readable by a processor, tangibly embodying a program of instructions executable by the processor to perform operations comprising:
  identifying digital sending devices in a communications network, wherein each of the identified digital sending devices comprises a combination of hardware and software that is operable to capture data from documents and send the captured data over the communications network;
  generating an automated business process design comprising one or more definitions of user interactions with respective ones of the identified digital sending devices and one or more functions performed by respective ones of the digital sending devices; and
  translating the automated business process design into digital sending device configurations comprising data processing rules for capturing the data and instructions for sending the captured data over the communications network in accordance with the automated business process design; and
  configuring the identified digital sending devices in accordance with the digital sending device configurations.

18. The program storage device of claim 17, wherein the translating comprises a digital sending device configuration for each of the identified digital sending devices.

19. The program storage device of claim 17, wherein the translating comprises creating the data processing rules.

20. The program storage device of claim 19, wherein the creating comprises setting digital sending protocols.

21. The program storage device of claim 20, wherein for the setting comprises one or more of: setting encryption standards, setting signature requirements, setting file format types, collecting retrieval index information, setting compression requirements, and setting network addresses.

22. The program storage device of claim 17, wherein the configuring comprises remotely configuring each identified digital sending device to perform the automated business process.

23. The program storage device of claim 22, wherein the remotely configuring each identified digital sending device comprises using a remote configuration application to send two or more of the digital sending devices a configuration in parallel.

24. The program storage device of claim 17, wherein to the generating comprises:
  generating at least one data-processing template for the business process; and
  generating at least one workflow-routing template for the business process.

25. The program storage device of claim 17, wherein the generating comprises generating a user device interaction template for the business process.

26. The program storage device of claim 25, wherein the translating comprises selecting information technology templates based on the at least one data-processing template and the at least one workflow-routing template.

27. A content management system comprising:
- a network means for execution of a remote configuration application;
- a plurality of digital sending devices in the network means, wherein each of the digital sending devices comprises a combination of hardware and software that is operable to capture data from documents and send the captured data over the communications network;
- an automated business process authoring means for enabling a user to define and select data-processing templates and workflow-routing templates to create an automated business process design; and
- a translating means for translating the automated business process design into digital sending device configurations comprising data processing rules for capturing the data and instructions for sending the captured data over the communications network in accordance with the automated business process design.

28. The content management system of claim 27, wherein the translating means comprises a library of information technology templates.

29. The content management system of claim 28, wherein the automated business process authoring means comprises:
- a library of data-processing templates defining common sub-processes of automated business processes; and
- a library of workflow-routing templates defining common sub-processes of automated business processes.

30. The content management system of claim 29, wherein the translating means comprises a library of information technology templates and selects information technology templates from the library based on data-processing templates, workflow templates, and enterprise preferences.

31. The content management system of claim 30 wherein the enterprise preferences comprise one or more of: file format type; communications protocols; and network addressing conventions.

32. The content management system of claim 30, wherein the automated business process authoring means defines interconnects the data-processing templates and the workflow-routing templates in a process of defining the automated business processes.

\* \* \* \* \*

UNITED STATES PATENT AND TRADEMARK OFFICE
CERTIFICATE OF CORRECTION

PATENT NO. : 8,782,616 B2  
APPLICATION NO. : 10/756598  
DATED : July 15, 2014  
INVENTOR(S) : Wright Page 1 of 1

It is certified that error appears in the above-identified patent and that said Letters Patent is hereby corrected as shown below:

In the claims

Column 14, line 45, Claim 21, after "wherein" delete "for".

Column 14, line 59, Claim 24, after "wherein" delete "to".

Signed and Sealed this  
Twenty-ninth Day of December, 2015

Michelle K. Lee  
*Director of the United States Patent and Trademark Office*